United States Patent
Rácz et al.

(10) Patent No.: US 9,414,280 B2
(45) Date of Patent: Aug. 9, 2016

(54) TECHNIQUE FOR OPERATING A RADIO NETWORK CONTROLLER DURING A SOFT HANDOVER PROCESS

(75) Inventors: Sándor Rácz, Cegléd (HU); Szilveszter Nádas, Budapest (HU); Martin Skarve, Enebyberg (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 27 days.

(21) Appl. No.: 14/415,198

(22) PCT Filed: Jul. 30, 2012

(86) PCT No.: PCT/EP2012/003237
§ 371 (c)(1),
(2), (4) Date: Jan. 16, 2015

(87) PCT Pub. No.: WO2014/019591
PCT Pub. Date: Feb. 6, 2014

(65) Prior Publication Data
US 2015/0172984 A1    Jun. 18, 2015

(51) Int. Cl.
*H04W 4/00* (2009.01)
*H04W 36/18* (2009.01)
(Continued)

(52) U.S. Cl.
CPC ............ *H04W 36/18* (2013.01); *H04W 56/001* (2013.01); *H04W 92/12* (2013.01)

(58) Field of Classification Search
None
See application file for complete search history.

(56) References Cited

U.S. PATENT DOCUMENTS

| | | | |
|---|---|---|---|
| 2005/0255823 A1* | 11/2005 | Zhang | H04L 1/1812 455/333 |
| 2006/0140115 A1* | 6/2006 | Timus | H04L 47/10 370/230 |

(Continued)

FOREIGN PATENT DOCUMENTS

| | | |
|---|---|---|
| EP | 1755355 A1 | 2/2007 |
| EP | 1901499 A1 | 3/2008 |

(Continued)

OTHER PUBLICATIONS

Qualcomm, "Optimum re-ordering performance with Asynchronous Iub", 3GPP TSG-RAN WG2 meeting #46, Feb. 14, 2005, pp. 1-10, R2-050450, Scottsdale, US, 3GPP.

(Continued)

*Primary Examiner* — Ian N Moore
*Assistant Examiner* — Phong La
(74) *Attorney, Agent, or Firm* — Patents on Demand, P.A.; Brian K. Buchheit; Scott M. Garrett

(57) ABSTRACT

A technique for operating an RNC of a communication network during a soft handover process of a mobile terminal between a first BS and at least one second BS that are connected to the RNC is provided. A method implementation of the technique comprises receiving, at a MAC protocol layer of the RNC, a first data frame stream from the first BS via a first data path and a second data frame stream from the second BS via a second data path. A relative delay between the data frames of the first and the second data frame stream regarding their arrival at the RNC is determined. The relative delay takes into account different systematic propagation durations from the first BS and the second BS to the RNC. At then the MAC protocol layer, data frames of the first and the second data frame stream are then merged into a third data frame stream which is transmitted to a protocol layer above the MAC protocol layer. The merging of the data frames is carried out in dependence on the relative delay.

18 Claims, 4 Drawing Sheets

(51) Int. Cl.
*H04W 56/00* (2009.01)
*H04W 92/12* (2009.01)

(56) References Cited

U.S. PATENT DOCUMENTS

| | | | | |
|---|---|---|---|---|
| 2009/0129313 A1* | 5/2009 | Tamura | ............ | H04L 1/188 370/328 |
| 2010/0002632 A1* | 1/2010 | Park | ............ | H04L 47/10 370/328 |
| 2010/0238803 A1* | 9/2010 | Racz | ............ | H04L 47/10 370/235 |
| 2010/0240356 A1* | 9/2010 | Lee | ............ | H04W 36/32 455/422.1 |
| 2012/0147869 A1* | 6/2012 | Chhatriwala | ....... | H04W 28/065 370/338 |
| 2015/0341838 A1* | 11/2015 | Pinheiro | ........ | H04W 52/0251 455/449 |

FOREIGN PATENT DOCUMENTS

| | | |
|---|---|---|
| WO | 2005062654 A1 | 7/2005 |
| WO | 2011025435 A1 | 3/2011 |
| WO | 2011120581 A1 | 10/2011 |
| WO | 2012060763 A1 | 5/2012 |
| WO | 2014019592 A1 | 7/2012 |
| WO | 2012115545 A1 | 8/2012 |

OTHER PUBLICATIONS

3rd Generation Partnership Project, "3rd Generation Partnership Project; Technical Specification Group Radio Access Network; Medium Access Control (MAC) protocol specification (Release 11)", Technical Specification, 3GPP TS 25.321 V11.0.0, Dec. 1, 2011, pp. 1-198, 3GPP, France.

* cited by examiner

TECHNIQUE FOR OPERATING A RADIO NETWORK CONTROLLER DURING A SOFT HANDOVER PROCESS

TECHNICAL FIELD

The present disclosure generally relates to a Radio Network Controller (RNC). Specifically, a technique for operating the RNC during a soft handover process of a mobile terminal between a first Base Station (BS) and a second BS is described. The technique can be implemented as a method, a computer program product, a network node or an access network system.

BACKGROUND

Mobile communication networks often comprise a plurality of RNCs, each being connected to one or more BSs via a Transport Network (TN). The RNCs are interconnected and connected to other types of network nodes via a Core Network (CN). The BSs wirelessly communicate with communication devices, sometimes also called User Equipments (UEs). The UEs may take the form of mobile terminals.

One important feature of mobile communication networks is the possibility to handover, or handoff, mobile terminals. There exist different reasons why a handover can be beneficial. When, for example, a mobile terminal is moving away from an area covered by its serving BS ("source BS") and entering an area covered by a non-serving BS ("target BS"), an ongoing call may be transferred to the non-serving BS in order to avoid call termination when the mobile terminal leaves the coverage of the serving BS. In another example, when the capacity for connecting new calls of a serving BS is used up, an ongoing call from a mobile terminal located in an area overlapped by a non-serving BS may be transferred from the serving BS to the non-serving BS. In this way capacity in the serving BS will be freed-up for other mobile terminals that can only be connected to that BS.

Handovers can generally be divided into hard and soft handovers. In a hard handover process the connection to the serving BS is released and only then the connection to the non-serving BS is activated. Hard handovers are intended to be instantaneous so as to minimize the disruption to the call.

In a soft handover process the connection to the serving BSs is retained and used for a while in parallel with the connection to the non-serving BS. In this case the connection to the non-serving BS is established before the connection to the serving BS is broken. Soft handovers may involve using connections to two or more non-serving BSs.

One advantage of soft handovers is that the connection to the serving BS is broken only when a reliable connection to at least one non-serving BS has been established. The chances that the call will be terminated abnormally due to a failed handover are thus low. On the uplink, all the BSs that are actively supporting a call in a soft handover process send the data frame stream that they receive back to the RNC, typically along with information about the quality of the received signal. The RNC examines the signal qualities for all data frame streams and dynamically chooses the stream with the highest quality. Should the signal quality for one stream degrade rapidly, the chance is still good that a strong signal will be available at another BS supporting the call in the soft handover process. In this context, the RNC may combine, or merge, data frame streams received from the mobile terminal via different BSs.

SUMMARY

It is desirable to improve the efficiency of communication networks in respect of handling soft handover processes.

According to one aspect, a method of operating an RNC of a communication network during a soft handover process of a mobile terminal between a first BS and at least one second BS that are connected to the RNC is provided. The method comprises receiving, at a Medium Access Control (MAC) protocol layer of the RNC, a first data frame stream from the first BS via a first data path and a second data frame stream from the second BS via a second data path. A relative delay between the data frames of the first and the second data frame stream regarding their arrival at the RNC is determined, wherein the relative delay takes into account different systematic propagation durations from the first BS and the second BS to the RNC. At the MAC protocol layer, data frames of the first and the second data frame stream are merged into a third data frame stream which is transmitted to a protocol layer above the MAC protocol layer, wherein the merging of the data frames is carried out in dependence on the relative delay.

The different systematic propagation durations may at least partially be the result of different technical realizations of the first and the second data path. For example, if the first data path is mainly defined by optical fiber connections, and the second data path is mainly defined by copper wires, the first data path may generally transmit data faster than the second data path. There may exist alternative or additional technical characteristics of a TN comprising the data paths that may result in different systematic propagation durations.

The relative delay may be determined as a delay difference between associated data frames of the first and the second data frame stream. Associated data frames may in one example mean identical data frames (e.g., with the same Transmission Sequence Number, TSN) received during the soft handover procedure via different data paths from the mobile terminal, but may also mean that a data frame of the first data frame stream with a sequence number i is compared with a data frame of the second data frame stream with a sequence number i–1, for example.

In some implementations, the method may further comprise comparing the delay difference with a delay difference reference value, and merging the data frames dependent on a result of the comparison. The delay difference reference value may, for example, take the form of a threshold value.

The delay difference may be the sum of two or more delay values. A first delay value may reflect a systematic propagation duration difference between the associated data frames, and a second delay value may reflect a dynamic delay difference between the associated data frames. In the case of three or more data paths, the relative delay, and the resulting delay difference, may be determined for each individual pair of data paths.

The dynamic delay difference between the associated data frames may at least partially result from temporarily delaying the data frames. The data frames may be temporarily delayed in a TN comprising the first data path and the second data path. For example, the delay may be performed using one or more data queues or data buffers. A length of the one or more data queues or data buffers may be controlled by an Active Queue Management (AQM)-based congestion control mechanism.

The dynamic delay difference may be determined by processing time stamps of the associated data frames. The time stamps may be generated by one or both of the mobile terminal and the BSs. In one variant, the time stamps comprise at least one of Connection Frame Numbers, CFNs, and Subframe Numbers, SNs. Additionally, or as an alternative, TSNs may be used as time stamps.

If the delay difference for a data frame is below the delay difference reference value, then the data frame may be used as input of a MAC reordering process carried out in the MAC protocol layer. On the other hand, if the delay difference for a data frame exceeds the delay difference reference value, then the data frame may be discarded. Alternatively, if the delay difference for a data frame exceeds the delay difference reference value, then the data frame may be directly transmitted to the protocol layer above the MAC protocol layer, bypassing a MAC reordering process.

The MAC protocol layer may be a MAC-es protocol layer. The protocol layer above the MAC protocol layer may be a Radio Link Control (RLC) protocol layer.

An RLC Protocol Data Unit (PDU) may have a fixed size. In this case, the method may further comprise determining whether the relative delay is larger than an estimated RLC window wrap around time, and blocking a transmission of the corresponding delayed data frame from the MAC protocol layer to the RLC protocol layer if the delay difference is larger than the estimated RLC window wrap around time.

In case that the RLC PDU has a fixed size, the method may further comprise determining whether a data frame transmitted from the MAC protocol layer to the protocol layer above the MAC protocol layer comprises a gap filler PDU. The data frame may be discarded at the RLC protocol layer if the data frame is not a gap filler PDU. A gap filler PDU may be a PDU corresponding to a data frame directly transmitted to the RLC protocol layer (e.g., bypassing the MAC reordering process).

The first data path may be a serving data path, and the second data path may be a non-serving data path during the soft handover process. Accordingly, the first BS may be a serving BS, and the second BS may be a non-serving BS. There may be two or more second data paths that are configured as non-serving data paths for the soft handover process.

According to a further aspect, a computer program product is provided comprising program code portions for performing the steps of any one of the methods presented herein when the computer program product is executed on one or more computing devices. The computer program product may be stored on a computer-readable recording medium. The computer program product may also be provided for download via a network such as the Internet or a wireless communication network.

According to a still further aspect, an RNC for a communication network is provided that is configured for a soft handover of a mobile terminal between a first BS and at least one second BS that are connected to the RNC. The RNC comprises a receiving unit adapted to receive, at an MAC protocol layer of the RNC, a first data frame stream from the first BS via a first data path and a second data frame stream from the second BS via a second data path. The RNC further comprises a determining unit adapted to determine a relative delay between the data frames of the first and the second data frame stream regarding their arrival at the RNC, wherein the relative delay takes into account different systematic propagation durations from the first BS and the second BS to the RNC. Also, the RNC comprises a merging unit adapted to merge, at the MAC protocol layer, data frames of the first and the second data frame stream into a third data frame stream which is transmitted to a protocol layer above the MAC protocol layer, wherein the merging of the data frames is carried out in dependence on the relative delay.

According to another aspect, an access network system is provided comprising the RNC as presented herein, the first BS, the first data path, the second BS, and the second data path.

BRIEF DESCRIPTION OF THE DRAWINGS

In the following, the present disclosure will be described in more detail with reference to exemplary embodiments illustrated in the drawings, wherein.

DETAILED DESCRIPTION

Figure 1:
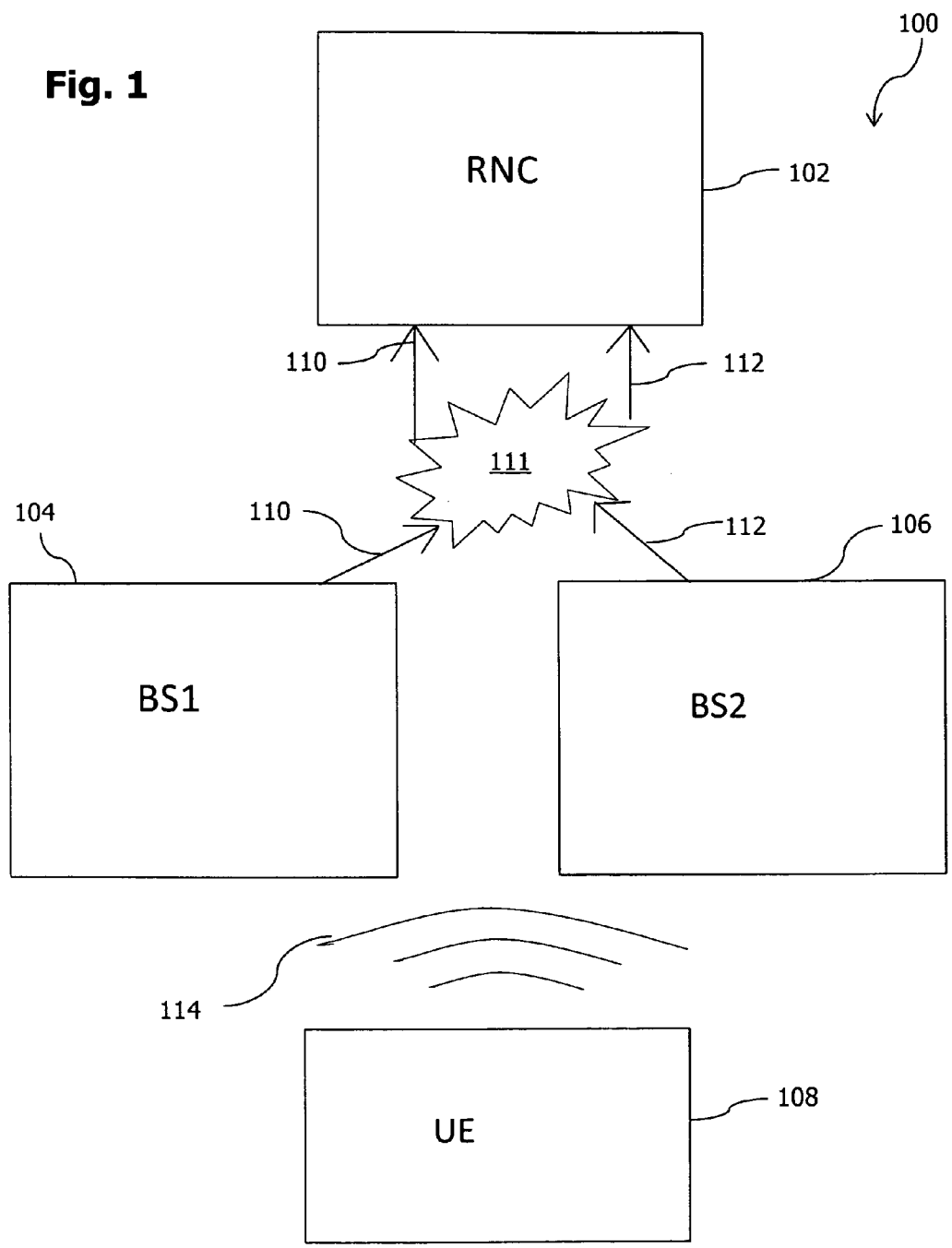
FIG. 1 shows a schematic drawing of an embodiment of a communication network.

In the following description, for purposes of explanation and not limitation, specific details are set forth, such as specific device and system configurations and specific methods, steps and functions, in order to provide a thorough understanding of the technique presented herein. It will be appreciated that the present technique may be practiced in other embodiments that depart from these specific details. For example, while the following embodiments will primarily be described with reference to an access network system in accordance with technical specifications of the Third Generation Partnership Project (3GPP), it will be appreciated that the present disclosure can also be realized in connection with other types of networks.

Those skilled in the art will further appreciate that the methods, steps and functions described herein may be implemented using individual hardware circuitry, using software functioning in conjunction with a programmed microprocessor or general purpose computer, using one or more Application Specific Integrated Circuits (ASICs), one or more Digital Signal Processor (DSPs) and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

With respect to the following embodiments, the same reference numerals are used to denote the same or similar components.

FIG. 1 shows an embodiment of a part of a communication network 100 comprising an RNC 102, a first BS 104, a second BS 106, and a UE 108. The first BS 104 and the second BS 106 are connected to the RNC 102 via a TN 111. That is, the first BS 104 is connected to the RNC 102 via a first data path 110 through the TN 111 (also referred to as first leg), and the second BS 106 is connected to the RNC 102 via a second data path 112 through the TN111 (also referred to as second leg). The first data path 110 and the second data path 112 may be partially identical at a physical level. The combination of RNC 102, first BS 104, second BS 106, first data path 110 and second data path 112 will in the following also be referred to as access network system.

In a soft handover process the UE 108 is wirelessly connected to both the first BS 104 and the second BS 106 (and, optionally, to one or more further BSs) and sends data packets or data units ("original" data frame stream 114) towards the first BS 104 and the second BS 106. In the following it will be assumed that the first BS 104 will be the serving BS in the soft hand over process, whereas the second BS 106, and, optionally, one or more further BSs function as non-serving BSs.

The data which are received by the first BS 104 from the UE 108 are converted into a first data frame stream which is sent via the first data path 110 through the TN 111 to the RNC 102. In the same way, the data which are received by the second BS 106 are converted into a second data frame stream which is sent via the second data path 112 through the TN 111 to the RNC 102.

In the RNC 102, the first data frame stream and the second data frame stream are merged into a third data frame stream at a lower communication protocol layer of the RNC 102. The resulting third data frame stream is then transmitted to a higher communication protocol layer of the RNC 102 (above the lower communication protocol layer). From there, the third data frame stream may be forwarded into a core network (not shown) which connects the RNC 102 to other RNCs or other nodes of the communication network.

The purpose of the merging process at the RNC 102 is to restore, during the soft handover process, the original data stream 114 sent from the UE 108 towards the first BS 104 and the second BS 106 to the extent possible. The merging process combines data frames of the first data frame stream received via the first data path 110 and the second data frame stream received via the second data path 112 into the third data frame stream.

Often neither the first data frame stream nor the second data frame stream comprises the complete data contained in the original data frame stream 114. For example, the signal quality of the original data frame stream 114 may vary and will generally be different from the perspective of the first BS 104 on the one hand and the second BS 106 on the other. Thus, the merging process may switch between the first data frame stream and second data frame stream dependent on associated signal quality information (e.g., as provided from the BSs 104, 106). Also, the order of the data frames of the first data frame stream and the second data frame stream arriving at the RNC 102 may not always be correct (i.e., may not correspond to the order of the data frames of the original data frame stream 114).

The merging process at the RNC 102, for example, delays and/or reorders the data frames received from the BSs 104, 106 such that the order of the data frames of the third data frame stream corresponds to the order of the data frames of the original data frame stream 114. The third data frame stream may still comprise some gaps if a data frame is neither received via the first data frame stream nor the second data frame stream (e.g., not received at all or not received in time). These gaps may then be closed by a higher communication protocol layer using retransmission functionalities.

In a soft handover process, associated data frames of the first data frame stream and of the second data frame stream having identical data content (e.g., having the same TSN) may not arrive at the same time at the RNC 102. This is not a problem if their relative delay does not exceed a certain threshold value. However, if the relative delay does exceed the threshold value, the merging process may not work properly.

In the merging process are reordering timer is used with a certain time-out value that defines how long the reordering process is waiting for a missing data frame. If the reordering processing is waiting too long for a missing data frame (e.g., in the case of a time-out value of 200 ms) and that data frame is lost in the TN 111 on both the first data path 110 and the second data path 112, then a higher layer retransmission cannot be triggered before 200 ms. To avoid such a large retransmission delay in case of TN losses, typically a smaller time-out value (of, e.g., 50 ms) is set for the reordering timer. However, with such a smaller time-out value it may occur that a data frame is not lost over the TN 111 but just arrives too late (e.g., after 60 ms). In conventional approaches, such a data frame is no longer subjected to the reordering process but simply discarded, so that a higher layer retransmission will be triggered. Practically, if the relative delay between associated data frames received via the first and second data frame stream, respectively, is larger than the time-out value for the reordering time, performance problems may occur.

Figure 2:
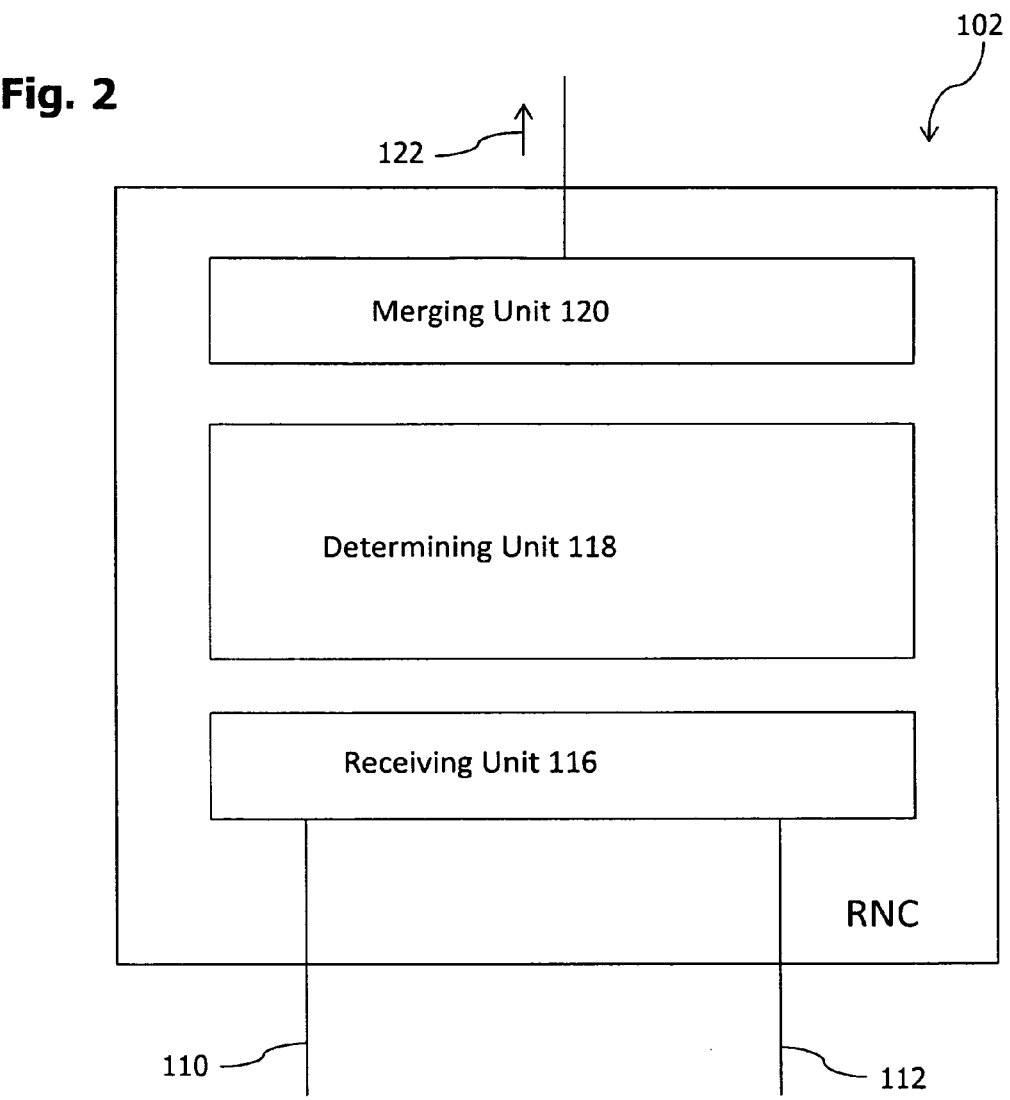
FIG. 2 shows a schematic drawing of an embodiment of an RNC.

In order to avoid such and other problems, according to an aspect of the present disclosure, an RNC 102 as shown in FIG. 2 is provided for use in the communication network 100 shown in FIG. 1. The RNC 102 is configured to handover the UE 108 from the first BS 104 to the second BS 106.

The RNC 102 comprises a receiving unit 116 adapted to receive, at a MAC protocol layer of the RNC 102, the first data frame stream from the first BS 104 via the first data path 110 and the second data frame stream from the second BS 106 via a second data path 112. The RNC 102 further comprises a determining unit 118 adapted to determine a relative delay between the data frames of the first and the second data frame stream regarding their arrival at the RNC 102. The relative delay takes into account different systematic propagation durations from the first BS 104 and the second BS 106 to the RNC 102 via the first data path 110 and the second data path 112, respectively. Also, the RNC 102 comprises a merging unit 120 to merge, at the MAC protocol layer, data frames of the first and the second data frame stream into a third data frame stream 122 which is transmitted to a protocol layer above the MAC protocol layer.

Figure 3:
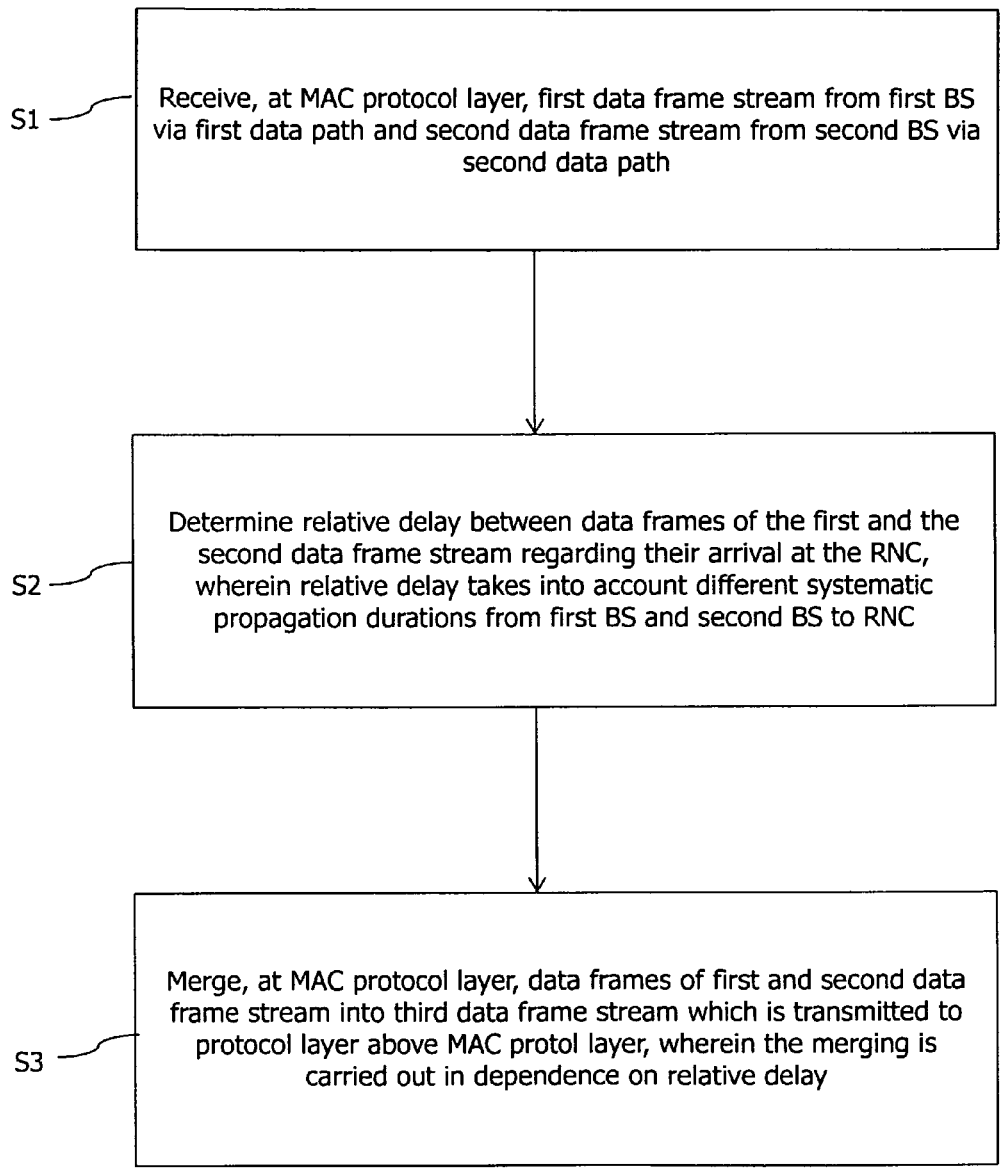
FIG. 3 shows a schematic flow chart illustrating an embodiment of a method for operating an RNC.

The RNC 102 of FIG. 2 can be operated as shown in FIG. 3. At step S1, at the MAC protocol layer of the RNC 102, the first data frame stream is received from the first BS 104 via the first data path 110, and the second data frame stream is received from the second BS 106 via the second data path 112. At step S2, a relative delay between the data frames of the first and the second data frame stream regarding their arrival at the RNC 102 is determined. The relative delay takes into account different systematic propagation durations from the first BS 104 and the second BS 106 to the RNC 102. The systematic propagation durations may be defined by system-inherent or static properties of the TN 111.

At the MAC protocol layer, data frames of the first and the second data frame stream are merged in step S3 into the third data frame stream 122 which is transmitted to a protocol layer above the MAC protocol layer. The merging of the data frames is carried out in dependence on the relative delay and, optionally, further parameters such as signal quality information from the BSs 104, 106. As an example, dependent on the relative delay it may be decided whether or not an individual data frame or data frame sequence is subjected to an MAC reordering process. Moreover, it may further be decided to either discard a delayed ("out-of-order") data frame or data frame sequence, or to directly send such a data frame or data frame sequence to the protocol layer above the MAC protocol layer (i.e., bypassing the reordering functionality).

In this way, the effect of the relative delay on the merging process can efficiently be evaluated and, if needed, controlled. Depending on the amount of relative delay and its contributions (e.g., in terms of systematic propagation durations and one or more dynamic delay components), the merging process can react differently, which makes it possible to tailor the behavior of the merging process to the current situation. Thus, even larger delays between the first data frame stream and the second data frame stream as well as delay variations can be properly handled.

By taking into account the systematic propagation durations in addition to dynamic delay contributions (e.g., due to TN congestion control actions or other TN specific processing actions) the "real" delay difference can be assessed. This permits an even better control of the merging process. Of course, in situations in which there is no significant difference in the systematic propagation durations, or the difference is small (e.g., lower a certain threshold value), then it may in certain cases be enough to only consider the dynamic delay components.

Figure 4:
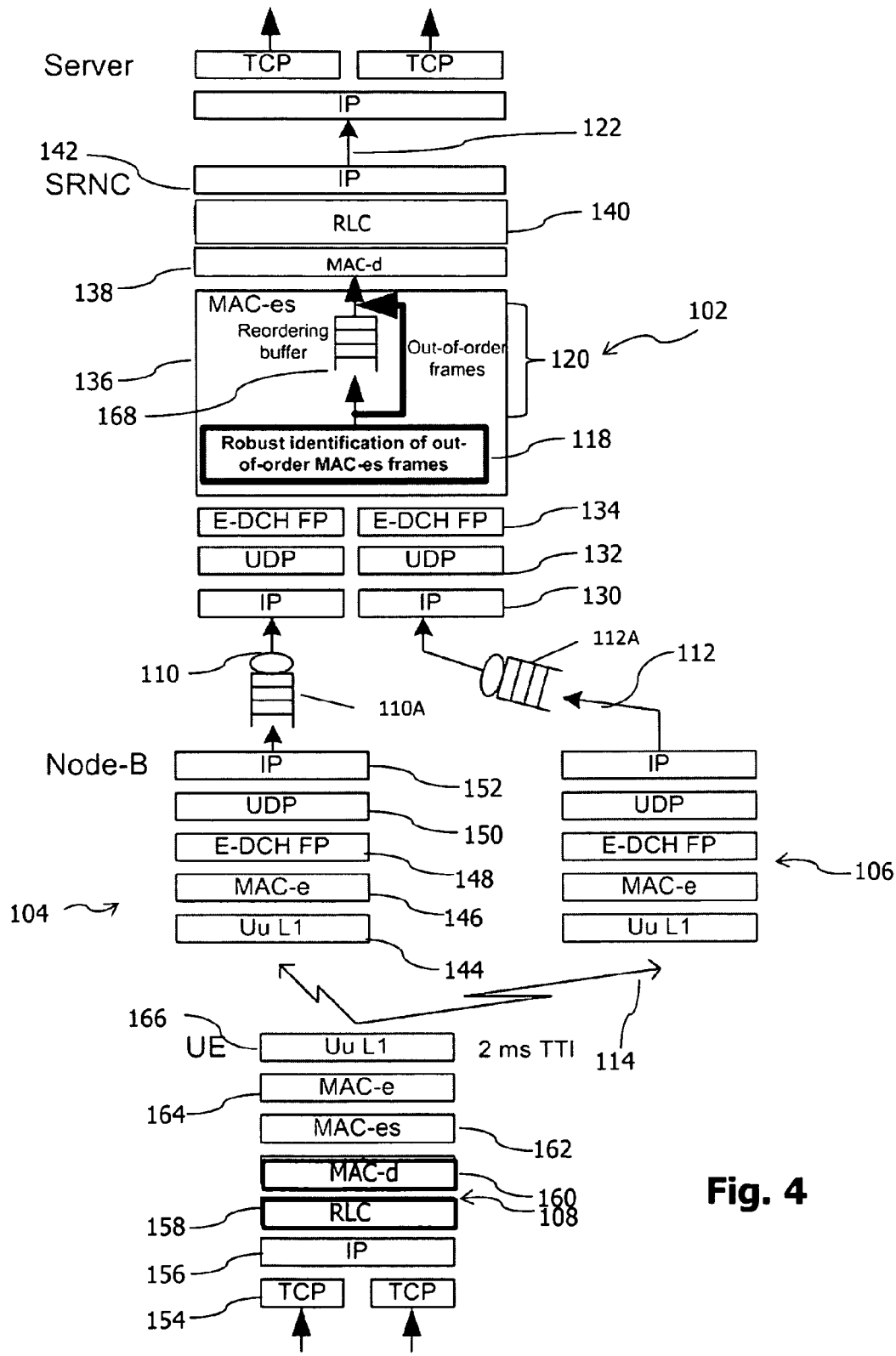
FIG. 4 shows a schematic drawing of an embodiment of operating an access network system comprising an RNC, a first BS, a second BS and associated data paths.

FIG. 4 shows the operation and possible implementations of the RNC 102 shown in FIG. 2, the first BS 104, the second BS 106 and the UE 108.

As illustrated in FIG. 4, the RNC 102 comprises, separately for each of the first data path 110 and the second data path 112, a lower Internet Protocol (IP) layer 130, a User Datagram Protocol (UDP) layer 132 above the lower IP layer 130, and an Enhanced Dedicated Channel (E-DCH) FP layer 134 above the UDP layer 132. An MAC-es layer 136 is provided above the UDP layers 132, a MAC-d layer 138 is provided above the MAC-es layer 136, a RLC layer 140 is provided above the MAC-d layer 138, and an upper IP layer 142 is provided above the RLC layer 140. It will be understood that additional or alternative layers may be provided in the RNC 102 as needed.

The MAC-es layer 136 of the RNC 102 comprises the merging unit 120 illustrated in FIG. 2 and a reordering buffer 168 in the merging unit 120. The reordering buffer 168 may selectively be bypassed as will be described in more detail below. The determining unit 118 in the MAC-es layer 136 is adapted to determine out-of order-data frames of the first data frame stream and the second data frame stream.

As will be appreciated, the RLC layer 140 on top of the MAC-es layer 136 requires in-order delivery of the data frames from the MAC-es layer 136. In-order delivery is required since, if the RLC layer 140 detects a missing RLC PDU (e.g., the RLC layer 140 receives a data frame with SN=40 and right after that a data frame with SN=42), it triggers a retransmission for the missing data frame (with SN=41) because it assumes that the missing data frame has been lost (even if the missing data frame arrives later at the RNC 102).

"De-ordered" delivery of the data frames from the MAC-es layer 136 to the RLC layer 140 would thus trigger unnecessary RLC retransmissions of data frames. In order to avoid an out-of-order delivery of data frames, a reordering functionality including the reordering buffer 168 is included within the MAC-es layer 136. This reordering functionality uses the MAC-es data frame TSN (as assigned by the UE 108) and possibly the SFN or SN (as assigned by the BSs 104, 106) to rearrange received MAC-es data frames so as to enable in-order delivery for RLC layer 140 (i.e., the reordering functionality waits for a while for missing data frames). The reordering functionality generally ensures that identical data frames of the UE 108 received from different data paths 110, 112 at the MAC-es layer 136 are sent only once to the RLC layer 140; in this case, one of the identical data frames is sorted out during the reordering/merging process. The reordering functionality may be based on reordering timer that defines the maximum period of time the reordering waits for receipt of a missing data frame.

As further illustrated in FIG. 4, each of the first data path 110 and the second data path 112 comprises a data queue 110A, 112A, respectively. The data queues 110A, 112A are in the present embodiment implemented on an application or transport layer of the TN 111 and used in connection with an AQM-based congestion control mechanism. According to AQM, a data frame will be queued if a data queue length is shorter than its maximum size, and dropped otherwise. The queue length may be adjusted dynamically to the prevailing congestion state. As will be appreciated, there are various possibilities for implementing the data queues 110A, 112A in connection with AQM mechanism.

The first BS 104 and the second BS 106 (here realized as Node-Bs) respectively comprise a Uu L1 layer 144, a MAC-e layer 146 above the Uu L1 layer 144, an E-DCH FP layer 148 above the MAC-e layer 146, an UDP layer 150 above the MAC-e layer 146, and an IP layer 152 above the UDP layer 150. Additional or alternative layers may be provided in the first BS 104 and the second BS 106.

Still referring to FIG. 4, the UE 108 comprises a TCP layer 154, an IP layer 156 above the TCP layer 154, a RLC layer 158 above the IP layer 156, a MAC-d layer 160 above the RLC layer 158, a MAC-es layer 162 above the RLC layer 158, a MAC-e layer 164 above the MAC-es layer 162, and an Uu L1 layer 166 above the MAC-e layer 164. Again, additional or alternative layers may be provided in the UE 108.

In the scenario of FIG. 4, the original data frame stream 114 is transmitted in the uplink over an air interface from the Uu L1 layer 166 of the UE 108, the Uu L1 layer 144 of the BSs 104, 106. The first data frame stream and the second data frame stream are exchanged between the IP layers 152 and 130 of the BSs 104, 106 and the RNL 102, respectively.

In the following, and still with reference to FIG. 4, some possible effects which may occur during a soft handover process will be discussed, wherein it is assumed that the determining unit 118 and the bypassing functionality are deactivated in the RNC 102 shown in FIG. 4.

In soft handover process, the two BSs 104, 106 receive the signal (original data frame stream 114) of the UE 108. Thus, the same data arrives at the RNC 102 from the two BSs 104, 106 via the two data paths 110, 112. The MAC-es entity 136 below the RLC layer 138 merges the data received from the different data paths 110, 112 as has been described above. Usually, for each of the data paths 110, 112 and queues 110A, 112A, a separate AQM-based congestion control entity having its own TN congestion detection and TN congestion action mechanism is used in the TN 111 (see FIG. 1). This means that the TN congestion detection/control works on a per data path basis.

In the UE 108, each MAC-es frame receives a TSN (6 bit value). After having sent the Mac-es frames from the UE 108 to the BSs 104, 106, the BSs 104, 106 respectively add additional time stamps (CFNs and SNs) to a Iub FP Data Frame containing the MAC-es frame.

As stated above, one of the main functionalities of the MAC-es layer 136 in the RNC 102 is reordering. This functionality reorders received MAC-es frames (MAC-es PDUs) according to their TSN and, optionally, BS tagging (i.e., according to their CFNs and SNs). To do so, in the MAC-es layer 136, MAC-es PDUs with consecutive TSNs are delivered to a disassembly function upon reception and input into the reordering buffer 168.

The systematic (e.g., system inherent or static) propagation delay difference between the BSs 104, 106 and the RNC 102 varies depending on different factors, such as the network technology of the TN 111 between the BSs 104, 106, and the RNC 102. For example, a propagation delay is very low when an optical fibre connection is used between the BSs 104, 106 and the RNC 102, but is high when the TN 111 comprises a plurality of hops and/or transport technology with higher propagation systematic delay (e.g., a copper wire-based xDSL connection between the BSs 104, 106 and the RNC 102). In addition to the systematic propagation delay, a dynamic delay may occur in the TN 111, for example due to the provision of the data queues 110A, 112A and other contributions.

The 6 bit Mac-es TSN space covers only 128 ms (64×2 ms) in case of a 2 ms Transmission Time Interval (TTI). This so-called wrap-around time is smaller than a potential delay difference among the different data paths 110, 112. Consider for example the case when the reordering functionality of the MAC-es layer 136 only relies on the TSNs of the received MAC-es frames. If the delay difference between packets using different data paths 110, 112 is larger than 128 ms, then the reordering functionality does not work properly. For example, assume that the first data path 110 (i.e., the serving data path) is not congested, but the second data path 112 (i.e., the non-serving data path) is congested. The resulting AQM control operations may lead to, for example, a 128 ms queuing delay between the first data frame stream routed via the first data path 110 and the second data frame stream routed via the second data path 112. As a consequence, a MAC-es frame with TSN=0 which is correctly received at both the first BS 104 and the second BS 106 and forwarded towards the RNC 102 arrives at the RNC 102 after, for example, 5 ms when routed via the first data path 110, but arrives 128 ms later at the RNC 102 when routed via the second data path 112. However, at the time when the MAC-es frame with TSN=0 routed via the second data path 112 arrives at the RNC 102, already an Mac-es frame with TSN=1 may have arrived via the first data path 110 at the RNC 102. This can cause anomaly.

This problem in particular occurs if AQM-based congestion control for Enhance Up-Link (EUL) or similar technologies is used, since then a TCP-friendly TN queue configuration to achieve a sufficient performance should be used. A suitable TN queue length is typically associated with a queuing delay between 100-300 ms. The introduction of AQM-based congestion control thus increases the needed TN buffer size in the TN nodes, and in this way also increases the potential dynamic one-way packet delay between the BSs 104, 106 and the RNC 102. The potential one-way packet delay difference between the data paths 110, 112 is also increased.

In order to better control the effects of relative delays between the first data frame stream routed via the first data path 110 and the second data frame stream routed via the second data path 112, according to the present embodiment, the determining unit 118 is used which takes into account not only dynamic delays (e.g., as expressed by TSNs, SNs and CFNs), but also different systematic propagation durations from the first BS 104 and the second BS 106 to the RNC 102. This enables to better judge whether the delay of a data frame results from a temporal congestion event or from a systematic cause. As a consequence, it is easier to determine whether a delayed data frame has to be judged to be an "out-of-order" frame (and receive a corresponding treatment as shown in FIG. 4) or not.

In order to take into account different systematic propagation durations from the first BS 104 and the second BS 106 to the RNC 102, the following approach may be adopted.

For each non-serving data path ("leg-i", i≥1), a delay difference over the TN 111 between the serving data path and the non-serving data path is computed, denoted by "delayDifference-i" for leg-i. Referring to FIG. 4, assuming that data path 110 is the serving data path and data path 112 is the (only) non-serving data path, this means that the delay difference between data path 110 and data path 112 is computed. In the following, it will be assumed for reasons of simplicity that there is only one non-serving data path, namely data path 112.

If the delay difference is larger than a predefined reference value, denoted by "maxDelayDifference", then data frames arriving over data path-i are determined to be out-of-order MAC-es frames by the determining unit 118.

The calculation of delayDifference-i may be carried out as follows:

delayDifference-*i*=propagationDelayDifference-*i*+ dynamicDelayDifference-*i*, wherein "propagationDelayDifference-i" is a systematic propagation delay difference value over the TN 111 which can for example be manually set by the operator based on detailed knowledge about the TN 111, or can be automatically determined (by estimation or by measurement using any existing one-way delay measurement method), and "DynamicDelayDifference-i" is a dynamic delay difference which results from, for example, TN congestion events (e.g., AQM-based effects) and which can be calculated based on the CFN and SN of the Iub FP data frames of the first data frame stream and the second data frame stream. The delay difference may be updated, for example each time a data frame is received at the RNC 102 or periodically, for example at every 100 ms.

If, for a data frame of the non-serving data path 112, delayDifference-i>maxDelayDifference at the time of arrival of the data frame at the RNC 102, then the data frame may be considered as an out-of-order MAC-es frame. A typical value for maxDelayDifference may for example be 100 ms in case of a 2 ms TTI. If the non-serving data path 112 has a better (faster) data path through the TN 111 and/or a better quality of radio reception of the original data frame stream 114 at the corresponding BS 106 of the non-serving data path 112, compared to the serving data path 110, then the non-serving data path 112 may be used as a reference instead of the serving data path 110. For example, in the access network system shown in FIG. 4, instead of determining the delay differences between the serving data path 110 and all non-serving data paths (i.e., data path 112 and optionally further non-serving data paths), respectively, the delay difference between non-serving data path 112 and serving data path 110 and further, i.e., non-serving data paths may be calculated.

If a data frame is identified as an out-of-order frame (i.e., as having arrived too late at the RNC 102), then it may bypass the reordering buffer 168 as illustrated in FIG. 4. For example, it may be directly delivered to the RLC layer 140 (e.g., to an RLC AM entity). That is, the out-of-order frame may not be put into the reordering buffer 168 of the MAC-es layer 136. Alternatively, the out-of-order data frame may simply be dropped (i.e. discarded) and neither be forwarded to the RLC layer 140 nor be put into the reordering buffer 168.

If the bypassing out-of-order data frame (i.e., its content, the RLC AM PDU, which is the payload of the MAC-es frame, i.e. the MAC-es PDU) has already been received by the RLC layer 140, then the RLC layer 140 may simply discard the directly forwarded out-of-order data frame. However, in case that the content of the out-of-order frame has not yet been received by the RLC layer 140 (e.g., because there is an ongoing retransmission for this out-of-order frame triggered by a loss of this data frame over the serving data path 110), then the RLC layer 140 may use the content of the bypassing out-of-order data frame instead of waiting for the content of the data frame to be delivered by the retransmission process. In this way, the out-of-order MAC-es data frames do not disturb the normal operation of MAC-es reordering functionality, and the RLC layer 140 nevertheless has the possibility to use the content of the out-of-order MAC-es PDU. That is, the RLC AM Round Trip Time ("RTT") can be decreased by not waiting for retransmitted PDUs for example over the serving data path when the same PDU already has arrived over a non-serving data path.

As has become apparent, embodiments of the present disclosure improve the performance of conventional reordering mechanisms in soft-handover mode by optionally adding, to the conventional reordering functionality, a bypass functionality which bypasses the reordering functionality for out-of-order data frames. The term "merging" may be understood as sum of the reordering functionality and the bypass functionality (i.e., the third data frame stream is generated using both reordering functionality and bypass functionality).

To give an example: Assume that a data frame comprising an RLC PDU with SN=40 is lost over the first data path 110 and has arrived correctly over the second data path 112, but with 60 ms delay. Assuming that a MAC reordering timer waits for each data frame for 50 ms, then the MAC-es layer 136 is waiting for data frame with SN=40 for 50 ms and after that decides to determine this data frame to be an out-of-order data frame (i.e., it cannot put the data frame into the reordering buffer 168). As a result, the third data stream has a gap (data frame with SN=40 is missing). The RLC layer 140 detects this gap and triggers retransmission of data frame with SN=40 from the UE 108 to the RNC 102. Evidently, retransmission of the data frame with SN=40 from the UE 108 to the RNC 102 consumes a considerable amount of bandwidth and time.

Using the bypassing functionality, it is now possible to directly forward the delayed (i.e., the missing) data frame with SN=40 to the RLC layer 140 as soon as it arrives over the second data path 112, although it had a delay of 60 ms when arriving at the RNC 102 (and therefore was simply discarded in conventional approaches). The bypassing data frame will thus be available at the RLC layer 140 earlier than the corresponding data frame requested for retransmission will arrive at the MAC-es layer 136. Thus, the RLC layer 140 can use the delayed data frame with SN=40 instead of the data frame with SN=40 retransmitted from the UE 108, which will arrive even later than the delayed data frame. The retransmitted data frame may then be simply dropped at the RLC layer 140.

It should be noted that the sequence number space for RLC AM PDUs is significantly larger (typically 2047 ms) than the sequence space for MAC-es (typically 64 ms). This means, for example, that an undesired reuse of the same RLC AM sequence number may happen only if the delay difference of the out-of order frames is larger than the RLC wrap-around time of ca. 4 s (in case of a flexible RLC PDU size).

Especially when a packet-centric RLC is used, then an expected wrap-around time of the RLC window is thus much higher than the 128 ms wrap-around time of a MAC-es sequence number. In this case, no problems occur when out-of-order data frames are directly forwarded from the MAC-es layer 136 to the RLC layer 140.

In case that the RLC PDU size is fixed and in particular when additionally maximum EUL speed is used, then the expected wrap-around time of the RLC window is in the order of the 128 ms wrap-around time of the MAC-es sequence number. If an EUL flow has a much lower transmission rate (e.g., in case of TN limitation or in case of an air interface limitation), the actual wrap-around time of the RLC window is much larger than the wrap-around time of a MAC-es sequence number.

Direct transmission of out-of-order frames from the MAC-es layer 136 to the RLC layer 140 may (e.g., selectively) be suppressed if an RLC window wrap-around may happen since in this case the direct transmission of the out-of order data frames may potentially cause RLC protocol problems.

Thus, in order to avoid such problems, and in case of a fixed RLC PDU size, the following approaches (and arbitrary combinations thereof) may be used:

The last (recent) RLC window wrap around time is determined or estimated. This can for example be done by RLC PDU counting during the recent RLC window wraparound time, or by analyzing time stamps indicating the positions of the recent RLC window. If the above defined delayDifference-i is larger than the estimated RLC window wrap around time (optionally with some safety margins), then it may be determined to not pass the out-of-order frames to RLC layer 140 using the bypassing functionality.

Alternatively or additionally, an out-of-order delivery procedure may be implemented in the RLC layer 140. If an out-of order data frame is directly passed from the MAC-es layer 136 to the RLC layer 140, then the RLC layer 140 determines whether the PDU is a "gap-filler" PDU or not. The PDU is a gap filler if it can close a data frame gap in the third data frame stream. When the PDU is not a gap filler, the PDU may be dropped. Such a PDU may be identified by checking whether that PDU is missing in the third data stream, and whether some PDUs after the missing PDU have arrived. In this way, a PDU received by an out-of-order delivery procedure (direct transmission) at the RLC layer 140 does not create new gaps at the end of the RLC window.

As has already be mentioned above, congestion events can cause dynamic delays in the first data frame stream and in the second data frame stream. In the following, some more details about possible congestion events as well as their handling (congestion control) will be given. The congestion handling approaches discussed hereinafter may be implemented in connection with any of the embodiments illustrated in FIG. 1 to FIG. 4. It will be understood that the congestion handling may be based on AQM or any alternative congestion handling mechanism.

In Wideband Code Division Multiple Access (WCDMA) and similar radio access network embodiments, the RNC and the BSs are connected via a TN as discussed above. In some cases, the TN is a potential bottleneck, (i.e., prone to TN congestion events). Without handling TN congestion events, application level throughput and delay degradation may occur. Thus, the bottleneck in the TN can cause undesired and unnecessary application level degradation. In other words, TN congestion control is necessary.

TN congestion control generally comprises a TN congestion event detection process and a congestion action process. The TN congestion event can for example be detested by observing a data packet flow between the RNC and BSs. For example, a TN loss can be considered as a TN congestion event which can be identified based on a gap in Iub FP sequence numbers, or based on time stamps added to Iub FP data packets (frames). Also a delay of data packets can be considered as a TN congestion event. The TN congestion event may also be detected by the TN itself and signaled to a RNC or to other radio access network nodes by using, for example, an Explicit Congestion Notification ("ECN") mechanism.

Once the TN congestion event has been detected, a congestion action has to be initiated in order to resolve it. To resolve congestion caused by the TN congestion event, the load of the congested part of the TN may be reduced (i.e., the final result of the action may be a reduced bitrate). For example, when the Transport Control Protocol (TCP) protocol layer of the TN detects that a TCP segment (data packet) is missing (congestion event), then the TCP protocol layer may dynamically reduce (as a congestion action) a congestion window ("cwnd") by an AQM process, lowering in that the bitrate of the TCP protocol layer flow (consequence of the congestion action).

The TN congestion action may be a rate-based congestion control which reacts to the congestion event directly with bitrate reduction to resolve the congestion. After having resolved the congestion, the bitrate may be gradually increased again. The bitrate may for example be modified by sending absolute or relative grants to the UE as generally known in the art. For this purpose, a shaper may be used at a transmitter side (i.e., at the UE).

Application level TCP may be reused to handle TN congestion. That is, the TCP protocol layer of the communication protocol layer stack may decrease the bitrate of the TCP flow by modifying, for example, the congestion window (cwnd) TCP internal variable. The details of the congestion action may depend on the TCP version used.

As already indicated above, TN congestion may be detected based on gaps in sequence numbers of the corresponding protocol layers. After having detected a TN congestion event, the TCP protocol layer may be informed about the congestion event, in order to trigger the TCP protocol layer to carry out the congestion action (e.g., reducing the cwnd size). "Informing" the TCP protocol layer of the congestion event may be done in an active way or in a passive way. Passive informing may for example mean that, in case that the RLC protocol layer does not do retransmission for a lost packet over TN (i.e., the RLC protocol layer "skips" the lost data packet) which results in a gap of RLC sequence numbers, the TPC protocol layer itself recognizes a resulting gap in TCP sequence numbers (i.e., the TPC protocol layer will see that an IP packet is missing).

In the foregoing, principles, embodiments and modes of implementing the technique disclosed herein have exemplarily been described. The present invention should not be construed as being limited to the particular principles, embodiments and modes discussed therein. Rather, it will be appreciated that various changes and modifications may be made the skilled person without departing from the scope of the present invention as defined in the claims that follow.

The invention claimed is:

1. A method of operating a Radio Network Controller (RNC) of a communication network during a soft handover process of a mobile terminal between a first base station (BS) and at least one second BS that are connected to the RNC, the method comprising:
    receiving, at a Medium Access Control (MAC) protocol layer of the RNC, a first data frame stream from the first BS via a first data path and a second data frame stream from the second BS via a second data path, wherein a protocol layer above the MAC protocol layer is a Radio Link Control (RLC) protocol layer, wherein a RLC Protocol Data Unit (PDU) size is fixed;
    determining a relative delay between the data frames of the first data frame stream and the second data frame stream regarding their arrival at the RNC, wherein the relative delay is determined as a delay difference between associated data frames of the first and second data frame streams, wherein the determining further determines whether the relative delay is larger than an estimated RLC window wrap around time, wherein the relative delay takes into account different systematic propagation durations from the first BS and the second BS to the RNC;
    merging, at the MAC protocol layer, data frames of the first and second data frame streams into a third data frame stream, which is transmitted to a protocol layer above the MAC protocol layer, wherein the merging of the data frames is carried out in dependence on the relative delay; and
    blocking a transmission of the corresponding delayed data frame from the MAC protocol layer to the RLC protocol layer if the delay difference is larger than the estimated RLC window wrap around time.

2. The method of claim 1, wherein the different systematic propagation durations are a result of different technical realizations of the first data path and the second data path.

3. The method of claim 1, wherein the relative delay is determined as a delay difference between associated data frames of the first and second data frame streams, further comprising:
    comparing the delay difference with a delay difference reference value; and merging the data frames based on a result of the comparison.

4. The method of claim 3, wherein the delay difference is the sum of two or more delay values, a first delay value reflecting a systematic propagation duration difference between the associated data frames, and a second delay value reflecting a dynamic delay difference between the associated data frames.

5. The method of claim 4, wherein the dynamic delay difference between the associated data frames results from temporarily delaying the data frames.

6. The method of claim 5, wherein the data frames are temporarily delayed in one or more data queues or data buffers of a transport network comprising the first data path and the second data path.

7. The method of claim 6, wherein a length of the one or more data queues or data buffers is controlled by an Active Queue Management (AQM) based congestion control mechanism.

8. The method of claim 4, wherein the dynamic delay difference is determined by processing time stamps of the associated data frames.

9. The method of claim 8, wherein the time stamps of the data frames comprise at least one of Connection Frame Numbers (CFNs) and Subframe Numbers (SNs).

10. The method of claim 3, wherein, if the delay difference for a data frame is below the delay difference reference value, then the data frame is used as input of a MAC reordering process carried out in the MAC protocol layer.

11. The method of claim 3, wherein, if the delay difference for a data frame exceeds the delay difference reference value, then the data frame is discarded.

12. The method of claim 3, wherein, if the delay difference for a data frame exceeds the delay difference reference value, then the data frame is directly transmitted to the protocol layer above the MAC protocol layer, bypassing a MAC reordering process.

13. The method of claim 1 further comprising:
    determining whether a data frame transmitted from the MAC protocol layer to the protocol layer above the MAC protocol layer comprises a gap filler PDU; and
    discarding, at the RLC protocol layer, the data frame if the data frame is not a gap filler PDU.

14. The method of claim 1, wherein the first data path is a serving data path and the second data path is a non-serving data path during the soft handover process.

15. The method of claim 1, wherein the MAC protocol layer is a MAC-es protocol layer.

16. A computer program product stored in a non-transitory computer readable medium for controlling operation of a Radio Network Controller (RNC) of a communication network during a soft handover process of a mobile terminal between a first base station (BS) and at least one second BS that are connected to the RNC, the computer program product comprising software instructions which, when run on one or processing circuits, causes the one or processing circuits to:

receive, at a Medium Access Control (MAC) protocol layer of the RNC, a first data frame stream from the first BS via a first data path and a second data frame stream from the second BS via a second data path, wherein a protocol layer above the MAC protocol layer is a Radio Link Control (RLC) protocol layer, wherein a RLC Protocol Data Unit (PDU) size is fixed;

determine a relative delay between the data frames of the first data frame stream and the second data frame stream regarding their arrival at the RNC, wherein the relative delay is determined as a delay difference between associated data frames of the first and second data frame streams, wherein the processing circuits further determines whether the relative delay is larger than an estimated RLC window wrap around time, wherein the relative delay takes into account different systematic propagation durations from the first BS and the second BS to the RNC;

merge, at the MAC protocol layer, data frames of the first and second data frame streams into a third data frame stream which is transmitted to a protocol layer above the MAC protocol layer, wherein the merging of the data frames is carried out in dependence on the relative delay; and block a transmission of the corresponding delayed data frame from the MAC protocol layer to the RLC protocol layer if the delay difference is larger than the estimated RLC window wrap around time.

17. A Radio Network Controller (RNC) for a communication network for a soft handover a mobile terminal between a first Base Station (BS) and at least one second BS that are connected to the RNC, the RNC comprising:

a receiving circuit to receive, at a Medium Access Control (MAC) protocol layer of the RNC, a first data frame stream from the first BS via a first data path and a second data frame stream from the second BS via a second data path, wherein a protocol layer above the MAC protocol layer is a Radio Link Control (RLC) protocol layer, wherein a RLC Protocol Data Unit (PDU) size is fixed;

a determining circuit to determine a relative delay between the data frames of the first data frame stream and the second data frame stream regarding their arrival at the RNC, wherein the relative delay is determined as a delay difference between associated data frames of the first and second data frame streams, wherein the determining circuit further determines whether the relative delay is larger than an estimated RLC window wrap around time, wherein the relative delay takes into account different systematic propagation durations from the first BS and the second BS to the RNC;

a merging circuit to merge, at the MAC protocol layer, data frames of the first and the second data frame stream into a third data frame stream which is transmitted to a protocol layer above the MAC protocol layer, wherein the merging of the data frames is carried out in dependence on the relative delay; and a blocking circuit to block a transmission of the corresponding delayed data frame from the MAC protocol layer to the RLC protocol layer if the delay difference is larger than the estimated RLC window wrap around time.

18. An access network system, comprising:

a Radio Network Controller (RNC) for a communication network for a soft handover of a mobile terminal between a first base station (BS) and at least one second BS that are connected to the RNC, wherein the first BS is connected to the RNC via a first data path, wherein the second BS is connected to the RNC via a second data path, wherein the RNC comprises:

a receiving circuit to receive, at a Medium Access Control (MAC) protocol layer of the RNC, a first data frame stream from the first BS via the first data path and a second data frame stream from the second BS via the second data path, wherein a protocol layer above the MAC protocol layer is a Radio Link Control (RLC) protocol layer, wherein a RLC Protocol Data Unit (PDU) size is fixed;

a determining circuit to determine a relative delay between the data frames of the first data frame stream and the second data frame stream regarding their arrival at the RNC, wherein the relative delay is determined as a delay difference between associated data frames of the first and second data frame streams, wherein the determining circuit further determines whether the relative delay is larger than an estimated RLC window wrap around time, wherein the relative delay takes into account different systematic propagation durations from the first BS and the second BS to the RNC;

a merging circuit to merge, at the MAC protocol layer, data frames of the first and the second data frame stream into a third data frame stream which is transmitted to a protocol layer above the MAC protocol layer, wherein the merging of the data frames is carried out in dependence on the relative delay; and a blocking circuit to block a transmission of the corresponding delayed data frame from the MAC protocol layer to the RLC protocol layer if the delay difference is larger than the estimated RLC window wrap around time.

* * * * *